United States Patent
Scharkowski

(10) Patent No.: US 10,978,815 B2
(45) Date of Patent: Apr. 13, 2021

(54) JOINING A TERMINAL ELEMENT WITH A STRANDED CONDUCTOR

(71) Applicant: Auto-Kabel Management GmbH, Hausen im Wiesental (DE)

(72) Inventor: Oliver Scharkowski, Zell im Wiesental (DE)

(73) Assignee: Auto-Kabel Management GmbH, Hausen im Wiesental (DE)

( * ) Notice: Subject to any disclaimer, the term of this patent is extended or adjusted under 35 U.S.C. 154(b) by 0 days.

(21) Appl. No.: 16/469,880

(22) PCT Filed: Sep. 4, 2017

(86) PCT No.: PCT/EP2017/072080
§ 371 (c)(1),
(2) Date: Jun. 14, 2019

(87) PCT Pub. No.: WO2018/108342
PCT Pub. Date: Jun. 21, 2018

(65) Prior Publication Data
US 2019/0319375 A1    Oct. 17, 2019

(30) Foreign Application Priority Data
Dec. 16, 2016 (DE) .................. 10 2016 124 583.6

(51) Int. Cl.
| H01R 13/187 | (2006.01) |
| H01R 4/62 | (2006.01) |
| B23K 20/10 | (2006.01) |
| H01R 11/28 | (2006.01) |
| H01R 43/02 | (2006.01) |
| H02G 3/06 | (2006.01) |

(52) U.S. Cl.
CPC ............ H01R 4/625 (2013.01); B23K 20/10 (2013.01); H01R 11/28 (2013.01); H01R 43/0207 (2013.01); H02G 3/06 (2013.01)

(58) Field of Classification Search
CPC ........ H01R 4/023; H01R 4/187; H01R 4/625; H01R 4/029
USPC .................. 439/874, 875; 174/84 R, 90
See application file for complete search history.

(56) References Cited

U.S. PATENT DOCUMENTS

| 6,573,454 B2* | 6/2003 | Fujiwara ............. H01R 4/183 174/74 R |
| 8,704,088 B2* | 4/2014 | Frey ............. H01B 7/1855 174/36 |
| 2009/0249616 A1* | 10/2009 | Froschl ............. H01R 4/625 29/745 |

FOREIGN PATENT DOCUMENTS

| CN | 101925434 A | 12/2010 |
| EP | 1032077 A2 | 8/2000 |
| EP | 1246301 | * 10/2002 |
| EP | 2227347 A1 | 9/2010 |
| WO | WO2018/024715 | * 2/2018 |

* cited by examiner

*Primary Examiner* — Phuong K Dinh
(74) *Attorney, Agent, or Firm* — The Webb Law Firm

(57) ABSTRACT

A connection of a strand conductor to a connecting part, via an end of the strand conductor and a connecting part materially connected to the end of the strand conductor, wherein one end face of the end of the strand conductor is welded to the connecting part by means of ultrasound. A particularly good weld seam is achieved by first welding the end of the strand conductor to a sleeve using ultrasonic welding.

14 Claims, 5 Drawing Sheets

JOINING A TERMINAL ELEMENT WITH A STRANDED CONDUCTOR

CROSS-REFERENCE TO RELATED APPLICATIONS

This application is the United States national phase of International Application No. PCT/EP2017/072080 filed Sep. 4, 2017, and claims priority to German Patent Application No. 10 2016 124 583.6 filed Dec. 16, 2016, the disclosures of which are hereby incorporated by reference in their entirety.

BACKGROUND OF THE INVENTION

Field of the Invention

The subject matter relates to a connection of a stranded conductor with a connecting part with an end of the aluminium stranded conductor and a connecting part materially connected with the end of the stranded conductor. In addition, the subject matter relates to a method for the production of such a connection as well as the use of such a connection.

Description of Related Art

The connection of stranded conductors with connecting parts, for example cable lugs made of copper or other non-ferrous metals, is known from EP 1 032 077 A2, for example.

In the process known from EP 1 032 077 B2, a support sleeve is used by means of rotational friction welding to produce a material-locking joint between contact part, support sleeve and cable, which is essentially without air inclusions between the individual strands of the aluminium strand conductor in the joining zone. The aluminium strands on the sheath side only form a force-lock and positive-lock with the support sleeve. In combination with the aluminium strands of the aluminium strand conductor, the aluminium sleeve forms a material-lock with the cable lug at the end which consists of copper or other non-ferrous metals.

In the process known from EP 2 227 347 B1, the object is also solved by a joining connection between contact part, support sleeve and cable by means of torsional ultrasonic welding. Here, too, the aluminium strands on the sheath side only form a force-lock and positive-lock with the support sleeve. In combination with the aluminium strands of the aluminium strand conductor, the aluminium sleeve forms a material-lock with the connecting part at the front end. In torsional ultrasonic welding, the joining partners, namely the aluminium strand conductor and the connecting part, are moved relative to each other by means of axial movements.

A disadvantage of the rotational friction welding known from EP 1 032 077 B2 is that the joining partners must be rotationally symmetrical. Due to the high rotational speeds, asymmetries in the plane of rotation of the joining partners lead to imbalances, which negatively affect the joining process. The cost and weight of the cable lugs, which in practice are made of forged copper or brass, are also disadvantageous. In addition, the system price is high.

In addition, it is not possible to set a precisely defined axial angle between the joining partners during rotational friction welding. The end position of the rotary friction welding tools in relation to each other cannot be exactly defined. Even a radial angle of the joining partners to each other deviating from 0° is very difficult to achieve with rotational friction welding. Furthermore, the use of the rotational friction welding process is limited to cross-sections of more than 35 $mm^2$ due to the process and the cycle time of the process is very high.

In addition, the support sleeve, which is intended to absorb the upsetting forces from the rotary friction welding tool, is only connected to the strand conductor in a force-locking and positive-locking manner. The consequence of this is that the sleeve must be dimensioned correspondingly large in order to be able to absorb the pressing forces. Thus the cable also has a long and rigid contact connection area due to the generously dimensioned support sleeve. This contact connection area can cause problems when mounting the cable.

A disadvantage of the torsional ultrasonic welding described in EP 2 227 347 B1 is that the connecting parts often tear in practice due to the torsional introduction of the required joining energy using ultrasound. Furthermore, the equipment technology for torsional ultrasonic welding is very complex and error-prone.

SUMMARY OF THE INVENTION

The present invention is directed to a connection and a joining process with which stranded conductors can be connected to connecting parts in axially and radially defined positions safely and without damage, as well as guaranteeing a good electrical conductivity of the connection. In addition, the complexity of the joining process is to be reduced in order to be able to realize reliable industrial series production.

It has been recognized that with appropriate welding methods, in particular longitudinal ultrasonic welding, the pressed part, hereinafter also referred to as the support sleeve, can initially be pressed with the strand conductor in a positive-locking and force-locking manner. Subsequently, in the same tool, the positively and force-locked pressed support sleeve can be welded to the stranded conductors by means of ultrasonic welding. The material-locking connection between the strand conductor and the support sleeve is made on the sheath side. This has the advantage that higher pressing forces can be absorbed by the material lock from the inside of the sheath of the support sleeve and the outside of the sheath of the stranded conductor and the electrical conductivity of the connection is high.

This allows the support sleeve to be dimensioned with a small axial length and wall thickness compared to known methods. The non-electrically conductive oxide layer which has formed on the parts to be joined can also be broken up by the material-locking joining of the supporting sleeve and strand conductor by means of ultrasound. Welding the support sleeve allows the individual strands to form a material-lock in the area of the support sleeve. This results in better contact resistance from the stranded conductor to the support sleeve.

The advantage of the material-locking, sheath-side joining of the support sleeve with the stranded conductor also consists in the fact that cavities, which can occur during joining due to pure pressing, do not occur and thus corrosion by electrolyte is avoided.

It is also possible not to form the support sleeve rotationally symmetrically. A polygon is conceivable, such as a hexagon or square. Due to the material locking on the sheath side, pressing is less relevant for the actual joint than with previous solutions. Therefore, the support sleeve can also have other cross-sectional shapes as rotationally symmetrical.

It is also advantageous if the support sleeve extends beyond the stripped end of the stranded wire. The support sleeve can form a kind of bead on the insulation of the stranded wire. In this way, a gas-tight connection between the support sleeve and the stranded wire can be achieved.

It is also possible to design the support sleeve in a form that allows the individual strands of the stranded wire to be inserted through. This design has the advantage that the support sleeve can be securely positioned on the stranded wire.

After joining the support sleeve to the stranded wire, the support sleeve can be cut off at the front before it is connected to the connecting element, in particular cut flat, in particular cut or milled, or separated by other separating processes.

It is also possible that the support sleeve needs no further machining after joining to the stranded wire. A not completely flat joining surface or the direct joining of the connecting element to the individual strands of the stranded conductor inserted through the support sleeve is possible with the method described here. Unevenness or protruding individual strands are plasticized during the welding process and slide as a bead to the edge of the joining partners at the level of the joining zone, which results in additional corrosion protection. Since the support sleeve is already welded to the stranded wire, the stranded wire is no longer displaced in the sleeve during subsequent joining with the connecting part. In contrast to known methods, the stranded conductor is not pressed out of the support sleeve when the connecting part is pressed against the sleeve and/or the stranded conductor at the front.

For joining with the connecting element, the composite of support sleeve and stranded conductor is clamped. This allows the composite of support sleeve and stranded conductor to be aligned in a defined welding position relative to the connecting element and then ultrasonically welded. For example, the welding position can be at an angle, e.g. at an angle of 45° in particular, between the joining partners, the stranded wire composite and the connecting element.

When joining the connecting element, the composite of support sleeve and stranded conductor is clamped in order to align the composite of support sleeve and stranded conductor in a defined welding position to the connecting element when joining the connecting element by means of preferably longitudinal ultrasonic welding. The welding position can be such that the longitudinal axis of the support sleeve is at an angle other than 90° to the connection surface of the connecting part. In particular, angles of around 45° between the longitudinal axis of the support sleeve and the connection surface are possible.

For this purpose, it is suggested that a joining surface with the necessary angular offset is first prepared on the finished bond between the support sleeve and the strand conductor, e.g. by means of machining.

Even slight positioning errors of the describing joining partners in axial direction can be compensated with the method described here. The advantage of the free positioning of the described joining partners to each other lies in the freer construction of the cables and in the final assembly.

It is also suggested that the already described clamping and welding device, which is used for the composite of support sleeve and strand conductor, be used to carry out the subsequent joining process with the connecting element. The tool with which the support sleeve is first pressed to the stranded conductor, preferably with a positive-lock and a force-lock, can then weld the pressed support sleeve to the stranded conductor with suitable welding tools using ultrasonic welding.

The clamping device, which positions the composite of support sleeve and strand conductor for the joining process with the connecting element, can consist of the welding tools, which press the support sleeve with the strand conductor in a positive-lock and force-lock and then weld the positive-locked and force-locked support sleeve and the strand conductor with the connecting part in a material-lock. It might be necessary to adjust the horn head. The advantage here lies in the possibility of producing flexible, electrically conductive contacts at low cost, in high cycle times, uncomplicatedly and in high quality.

The connecting part can be a metallic flat conductor, sheet metal strip, sheet metal bent part, sheet metal stamped part, forged part or other object which has a welding surface and a surface for introducing the welding energy by means of a horn. The welding surface and the surface for applying the welding energy should preferably be parallel to each other. It is conceivable to geometrically adapt the working surface of the horn to the connecting element; this has the advantage of being even freer in the construction of the connecting elements.

It has been found that the welding energy can be brought into the joint particularly precisely if the ultrasonic welding is welded by means of ultrasonic roll welding. In ultrasonic roll welding, a torsion horn is provided which has its working surface on a circumferential surface. The horn is made to oscillate about its longitudinal axis. This causes the work surface to perform a rolling movement. The working surface should preferably be completely at a constant radial distance from the longitudinal axis of the horn. The working surface is pressed against the connecting part with a pressure and the rolling movement is initiated. The welding energy is uniformly introduced into the connecting part by the working surface.

It is also possible to first insert the stranded wire into the support sleeve on the front side beyond the support sleeve. If the support sleeve is then first ultrasonically welded to the stranded wire, this has the advantage that safe positioning of the support sleeve on the stranded wire is possible. This allows the support sleeve to be used with a shorter length. After joining the support sleeve to the stranded wire, the support sleeve together with the stranded wire can be separated flat on the face side, in particular cut or milled. The support sleeve together with the stranded wire then has a flat end face which is particularly suitable for subsequent welding.

It is also proposed, and being independently inventive and being combinable with all features described herein, that the support sleeve be omitted and that the individual strands at the stripped end of the stranded conductor be first compacted by means of preferably longitudinal ultrasonic welding in order to produce a compact material bond between the individual strands. At the end face of the welded strands, the connecting element can be joined by means of preferably longitudinal ultrasonic welding. With this embodiment, too, joining with the connecting element at an angle as described above is possible, preferably after machining of the end face of the compacted part.

It has been recognized that ultrasonic roll welding can be used to produce the welded joint with high precision and high welding energy. During ultrasonic roll welding, the joining partners are welded by means of a tangential movement of the working surface on the connecting part. The horn preferably oscillates around its longitudinal axis with a stroke between 5° and 0.1°, for example. The movement of the horn takes place in the ultrasonic range, for example with a frequency of 20 kHz or more. The joining partners are moved relative to each other in minimal amplitudes, for example 10-100 µm, preferably 20-40 µm. In particular, one joining partner can be firmly clamped and the other can be moved. Due to the excitation of the horn, it oscillates around the longitudinal axis and the working surface oscillates around the longitudinal axis. Since the working surface is as complete as possible with the same radial distance from the longitudinal axis, the working surface lies on the joining surface between the joining partners during vibration.

Since the welding energy is introduced by a rolling movement of the horn, the welding surfaces no longer have to be rotationally symmetrical. Rather, the most varied geometries of contact parts, such as rectangles, ovals or ellipses, can now be welded together. It is only necessary that the connecting part covers the strands of the stranded conductor as completely as possible on the end face. The same applies to longitudinal ultrasonic welding.

As the contact parts in ultrasonic roll welding can also be bent sheet metal parts (coated or uncoated), it is possible to replace the contact parts conventionally used in rotational friction welding, such as expensive forged cable lugs, with inexpensive bent sheet metal parts.

According to an embodiment, it is suggested that a pressing part surrounding the end of the stranded conductor presses the strands into a bundle. Pressing can be such that the bundle is free of air inclusions. Especially after stripping, the strands can be compacted by the pressed part. The strands are pressed together by means of mechanical pressing in such a way that cavities are reduced or removed. The pressed end of the stranded conductor can then be machined using a span-lifting process to remove oxides from the end face. For example, the end face can be milled over so that a flat end face is formed. The end surface can also be ground.

By avoiding cavities between the strands, corrosion in the weld area is prevented. In the area of the weld seam, the stranded conductor can be processed similar to a solid material, as cavities are avoided.

The pressed part can be formed as a sleeve or splicecrimp according to an embodiment. The sleeve can be pushed onto the stripped end of the stranded conductor and pressed before the stranded conductor is welded to the connecting part. A splicecrimp, for example, can be shaped in such a way that a piece of continuous strip, for example made of aluminium or alloys thereof, for example with a sheet thickness of 1 to 1.5 mm, is cut to length and attached to the stripped end of the stranded conductor. The flat strip material is placed around the strands and pressed so that a solid, compacted area is created at the end face of the strand conductor, which is suitable for welding to a contact part at the end face. The pressed part can then be welded to the stranded conductor on the sheath side. The flat strip material can, for example, be fed from an endless strip material.

Since the upsetting forces in ultrasonic roll welding are considerably lower than in rotary friction welding, the sleeve or splicecrimp can be dimensioned with small wall thicknesses. Here it is possible, for example, that the wall thicknesses of the sleeve or splicecrimps are between 0.5 and 2 mm. It is also possible that the axial length of the splicecrimps or the sleeve may be shorter than with rotational friction welding. For example, it is possible that the sleeve is shorter than 5 cm, preferably shorter than 3 cm, and especially shorter than 1 cm. Such an axial length is sufficient to absorb the compressive forces that occur.

During further welding, the stranded wire can be clamped in a suitable holder of a welding tool, which absorbs the axial forces occurring during welding. Here it is possible, for example, that the connecting part in the welding area is placed on the end face of the pressed stranded wire and axially loaded with the horn in the direction of the stranded wire.

Here it is possible, for example, that the working surface of the horn is pressed against the connecting part with a high contact pressure. The welding energy brought in by the rotation of the working surface is thus introduced into the connecting part and the pressed line.

According to an embodiment, it is suggested that the part to be pressed is the holder. For example, the tool holder can be shaped in such a way that the strands are pressed and compacted as explained above. In this case the use of a sleeve or a splicecrimps would be superfluous. The ultrasonic welding tool, in particular the holder, can also be used to achieve a sufficiently high compacting of the stranded wire.

As explained above, an embodiment suggests that a weld seam between the end face of the stripped end of the stranded wire together with the crimped part and the connecting part is free of voids.

The pressed part can be made of aluminium or alloys thereof according to an embodiment. In particular, the pressed part can be plastically deformable so that sufficient compacting of the aluminium strands of the aluminium strand conductor can be achieved. The strands can be made of an aluminium material. The strands can also be made of a copper material or an aluminium material laminated with a copper material.

The connecting part can be a flat conductor according to an embodiment. This can be, for example, a flat conductor extending over more than 30 cm. It is also possible that the flat conductor is a sheet metal bent part which is connected at one end to the aluminium strand cable and at the other end has a holder for a bolt or a screw.

The connecting part can preferably be a metallic connecting part. However, it is also possible that the connecting part is, for example, a metal-clad flat part. In particular, the connecting part can be a multiband of metal and plastic, in particular an aluminium bond. Here, layers of metal and plastic can be laminated together. These composite materials will increasingly be used in body construction in particular. Ultrasonic roll welding is a particular advantage for welding such a composite material to a stranded conductor.

It is also suggested that the connecting part is an L-shaped flat conductor, where one leg of the flat conductor is connected to the stranded conductor. The flat conductor can, for example, be punched from a strip unwound from a coil or from a sheet. During punching, for example, it is possible to directly form the flat conductor.

According to an embodiment, it is suggested that the connecting part is a round conductor. The connection between two round conductors, the aluminium stranded conductor and another round conductor, is also possible. The round conductor can also be a stranded conductor or another round conductor made of a solid material, for example. It is also possible that the round conductor is a connection bolt. The connecting bolt can be joined on the face side to the strand with the sleeve.

In particular, welding can also be carried out in such a way that a welding surface of an ultrasonic horn is placed on the connecting part, and in such a way that the welding surface is excited by means of a converter with an ultrasonic oscillation in such a way that the welding surface oscillates longitudinally and thereby introduces the welding energy into the connecting part and the strand conductor. This welding process can also be freely combined with all the features described here.

Another aspect is the use of a previously described connection for a motor vehicle power cable, in particular a battery cable.

BRIEF DESCRIPTIONS OF THE DRAWINGS

FIG. 2A shows a device for the second possible welded connection;

Figure 1A:
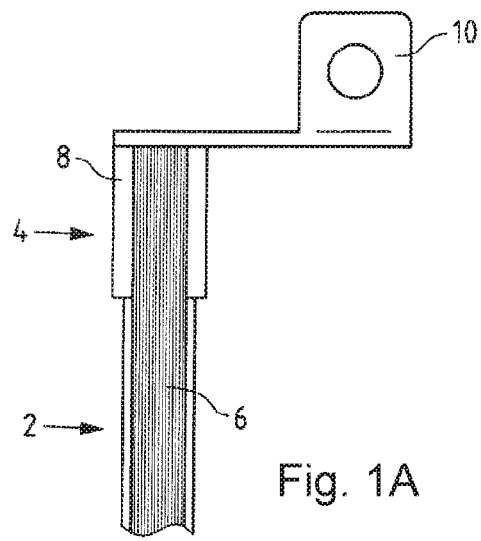
FIG. 1A shows a first possible welded connection of a stranded conductor with a flat conductor.

FIG. 1A shows a stranded conductor 2 (which can also be a stamped sheet metal part), for example an aluminium stranded conductor, which is referred to below as a representative, with a stripped end 4. The stripped end 4 shows the aluminium strands 6. The aluminium strand conductor 2 shown in FIG. 1A is pressed at its stripped end 4 by means of a sleeve 8 in such a way that the aluminium strands 6 are compacted so that between the aluminium strands 6 air inclusions are essentially removed. The inner surface of the sleeve 8 is then ultrasonically welded to the aluminium strands so that a material-locking connection is formed between the sleeve 8 and the aluminium strands 6.

The end face of the aluminium strand conductor 2, which is compacted in this way and connected to the sleeve in a material-locking manner, is freed of aluminium oxide, for example, by means of a machining process. A laser decoating can also be used.

Immediately afterwards, the stripped end 4 together with sleeve 8 is ultrasonically welded to a connecting part 10.

Figure 1B:
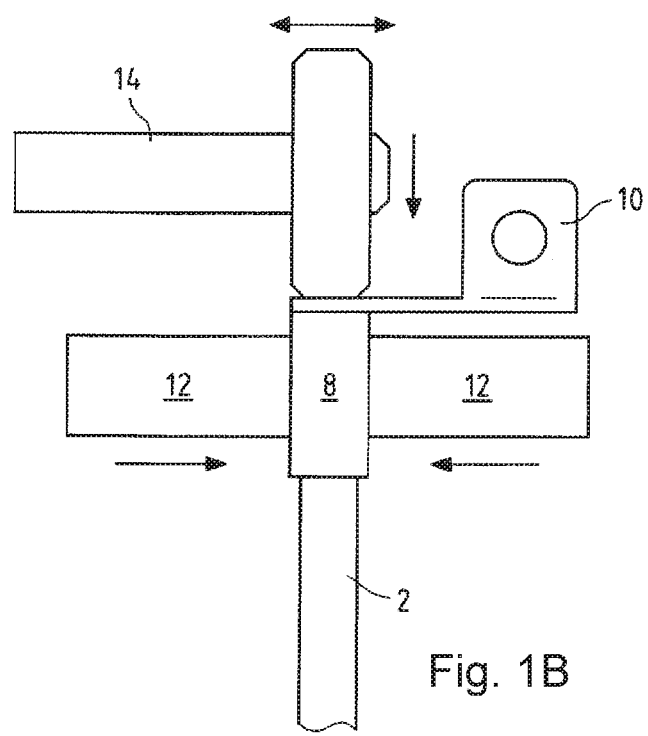
FIG. 1B shows a device for the first possible welded connection.

FIG. 1B shows a structure of a system for making a connection as shown in FIG. 1A.

The stripped end 4 of the stranded wire 2 is first clamped by two gripper arms 12. The gripper arms 12 could be press punches, which can press the sleeve positively with the stranded conductor. Either the stripped end 4 can be pressed alone or together with a sleeve 8. This results in a compacted end of the strands 6. After compaction, the gripper arms can weld the sleeve 8 to the strands 6 of the cable 2 as ultrasonic welding surfaces by means of ultrasonic welding. A material bond (material locking) is formed between the strands 6 and the inner surface of the sleeve 8.

The gripper arms 12 can then lead the sleeve 8 together with cable 2 to the connection part 10 formed here as a cable lug.

There a horn 14 can be guided in the direction of the longitudinal axis of cable 2 onto the contact surface between cable 2 and connection part 10. The grippers 12 form the counterforce to the contact pressure applied axially by the horn 14. The horn 14 can use ultrasonic welding, longitudinal or rolling, to introduce welding energy into the connection point between the connecting part 10 and the strands 6 and the sleeve 8 to create a material-locking connection between the connecting part 10 and the strands 6 and the sleeve 8.

Figure 2A:
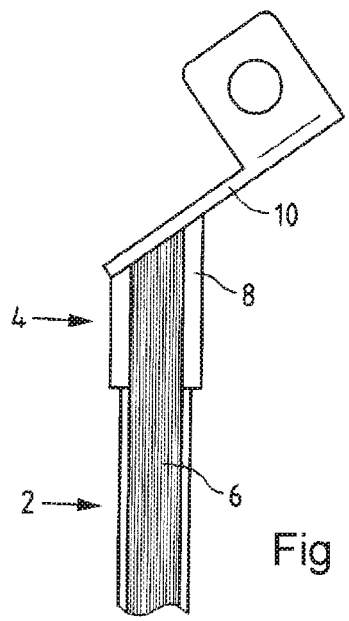
FIG. 2A shows a second possible welded connection of a stranded conductor with a flat conductor.

FIG. 2A shows a configuration similar to FIG. 1A. After compacting and/or welding between the strands 6 and the sleeve 8, an angled end face was first produced on the face side using a machining process. A connection part 10, here e.g. a flat conductor, can be welded to this end face at an angle to the longitudinal axis using ultrasonic welding. By welding between the sleeve 8 and the strands 6 on the inside of the sleeve 8, it is achieved that the strand 6 is pressed out of the sleeve 8 during the subsequent forming of the end face or welding with the connecting part 10.

Figure 2B:
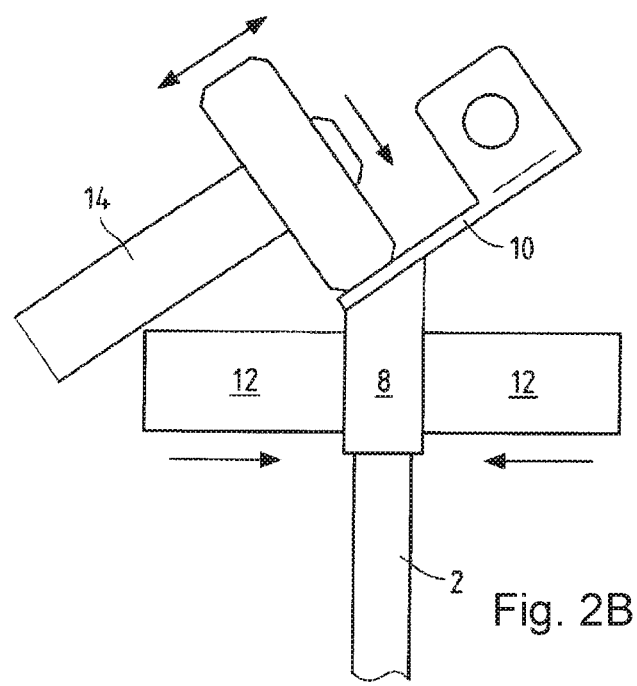

FIG. 2B shows a structure of a system for making a connection as shown in FIG. 2A.

The stripped end 4 of the stranded wire 2 is first clamped by two gripper arms 12. Either the stripped end 4 can be pressed alone or together with a sleeve 8. This results in a compacted end of the strands 6. After compaction, the gripper arms can weld the sleeve 8 on its sheath to the strands 6 of the cable 2 as ultrasonic welding surfaces by means of ultrasonic welding. A material bond is formed between the strands 6 and the inner surface of the sleeve 8.

The gripper arms 12 can then first guide the sleeve 8 together with cable 2 up to a milling device on which the end face is milled flat at an angle to the longitudinal axis of cable 2. Any protruding strand ends and parts of the sleeve are removed. Cutting is also possible.

The gripper arms 12 can then guide the sleeve 8 together with cable 2 to the connection part 10 formed here as a cable lug.

Here, a horn 14 can be brought up to the contact surface between cable 2 and connection part 10 at an angle to the longitudinal axis of cable 2. The grippers 12 form the counterforce to the contact pressure applied axially by the horn 14. The horn 14 can use ultrasonic welding, longitudinal or rolling, to introduce welding energy into the connection point between the connecting part 10 and the strands 6 and the sleeve 8 to create a material-locking connection between the connecting part 10 and the strands 6 and the sleeve 8.

Figure 3A:
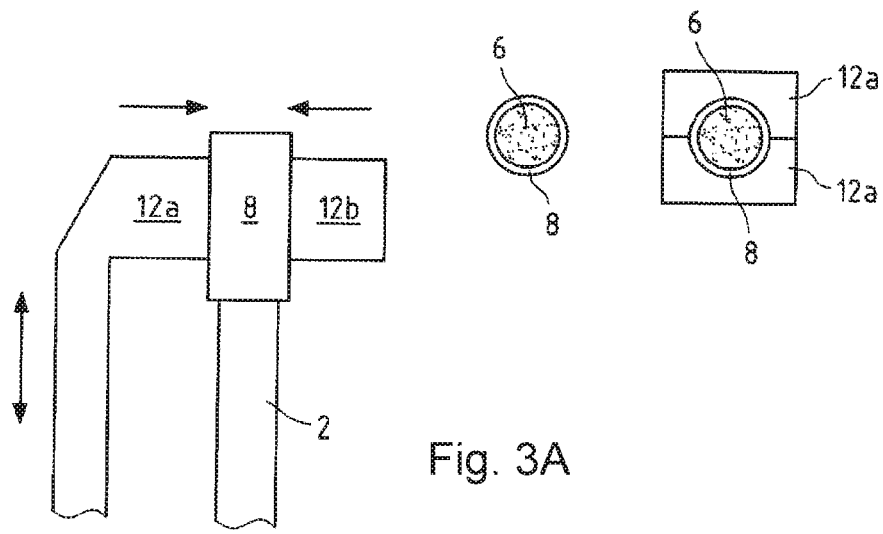
FIG. 3A shows a third possible welded connection of a stranded conductor with a flat conductor.

FIG. 3A shows a configuration of the gripper arms 12 for compacting and simultaneously welding strands 6 and sleeve 8, whereby a cross-section through sleeve 8 together with cable 2 with the gripper arms 12 is also shown.

A first gripper arm 12a can be formed as a horn and a second gripper arm 12b can be formed as an anvil.

First the gripper arms 12a, 12b are moved towards the sleeve 8 with the strands 6 as shown in the section and the sleeve 8 is pressed in such a way that the strands 6 are compacted in it.

The aluminium sleeve 8, for example, can have a wall thickness of less than 2 mm. The aluminium sleeve 8 can also be shorter than 5 cm, for example, and preferably shorter than 3 cm.

The sleeve 8 is then welded to the strands 6 on its inner surface by means of longitudinal ultrasonic welding, so that a material-locking connection is formed there.

Figure 3B:
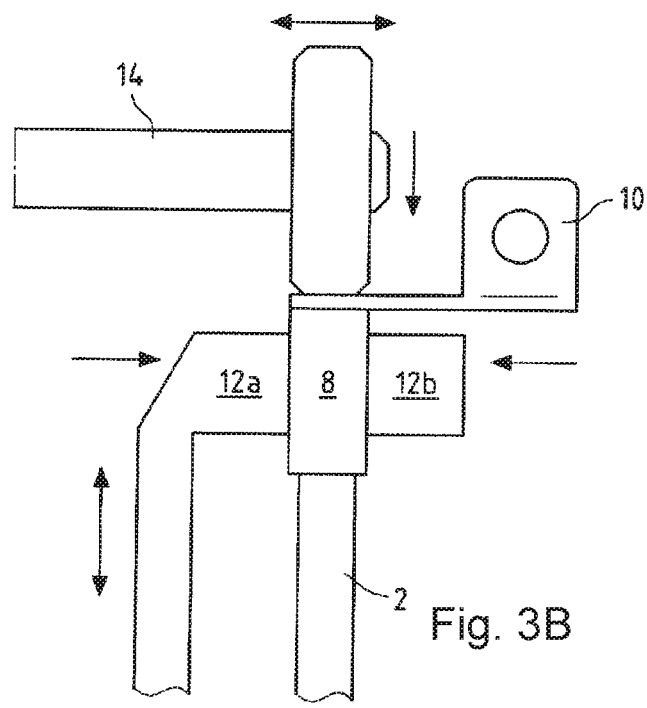
FIG. 3B shows a device for the third possible welded connection.

As shown in FIG. 3B, this connection is welded to the connecting part by the horn 14. For this purpose, the horn 14 is pressed against the connection part 10 and then the ultrasonic welding process is carried out. This creates a material-locking connection between the connecting part 10 and the strands 6 as well as the sleeve 8.

For welding, either longitudinal welding or roll welding can be used.

Ultrasonic roll welding enables joining partners to be welded together with short cycle times, for example with a welding time of 1.5 seconds or less, for example 1.2 seconds. The axial end position of the parts to be joined is permanently defined during ultrasonic roll welding.

Figure 4:
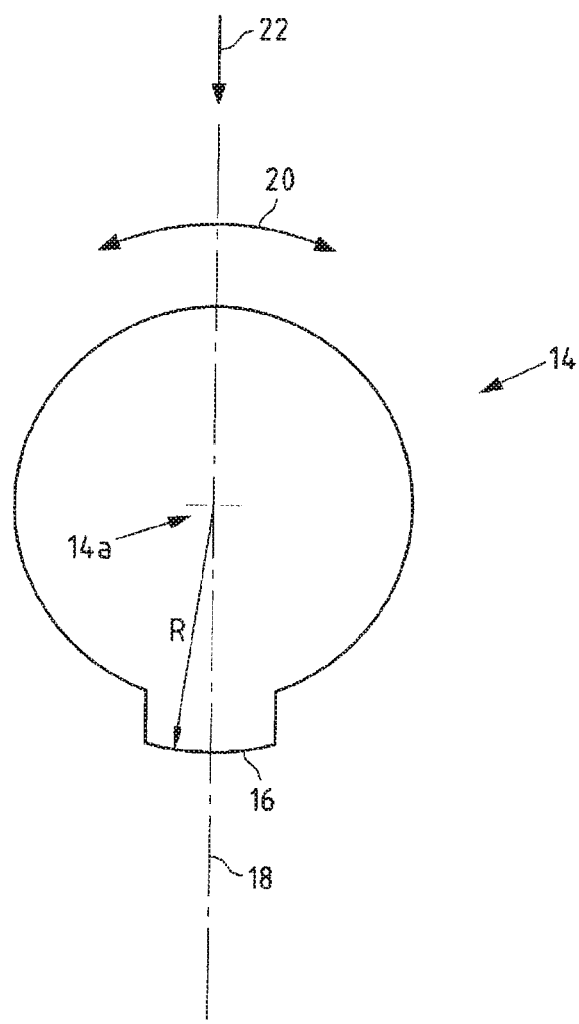
FIG. 4 shows a schematic representation of ultrasonic roll welding.

FIG. 4 shows a sectional view through a horn 14. The horn 14 is mounted so that it can rotate about its longitudinal axis 14a. A working surface 16 is provided on a circumferential surface of horn 14. The entire working surface 16 has a radial distance R from the longitudinal axis 14a. The horn 14 is preferably axially symmetrical to at least the symmetry axis 18, which runs perpendicular to the longitudinal axis 14a and preferably perpendicular to the working surface 16.

The horn 14 is rotated along direction 20 during roll welding, whereby the frequency of the oscillation is preferably at least 20 kHz. During this time the horn 12 is pressed in direction 22 against a workpiece to be welded.

Figure 5:
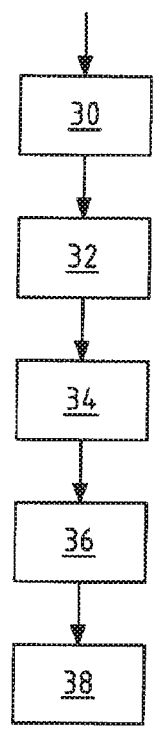
FIG. 5 shows a flow chart of a process according to an embodiment.

FIG. 5 shows schematically a flow chart of a method according to the subject matter. In a first step 30, an endless aluminium strip can be unwound from a coil and fed to a splicing crimping tool. For this purpose, the aluminium strip is cut in a single operation, formed around the strands 6 of the aluminium strand conductor 2 and pressed. This compacts the aluminium strands 6 of the aluminium strand conductor 2 and prevents cavities. This can be done in one step 32. In a step 34, the stripped end, which is pressed with the pressed part, is led with a sheet metal bending part to a horn 12 and the horn 12 presses the sheet metal bending part 10 against the end face of the aluminium strand conductor 6 and the pressed part 8. In a step 38, a rolling movement is applied to the sheet metal bending part 10 by means of the horn 12. Welding energy is thus transferred to the sheet metal bent part 10 and the aluminium strand conductor 6.

The invention claimed is:

1. A method for producing a connection between a stranded conductor and a connecting part, comprising:
    enclosing an end of the stranded conductor by a sleeve, and
    connecting the connecting part in a material-locking manner to the end of the stranded conductor,
    wherein an end face of the end of the stranded conductor is welded to the connecting part by ultrasonic welding,
    prior to the ultrasonic welding of the end face of the stranded conductor to the connecting part, the stranded conductor is ultrasonic welded to the sleeve,
    the strands of the stranded conductor are materially-locked together, and
    an outside surface of the stranded conductor is materially-locked to an inside surface of the sleeve.

2. The method according to claim 1, wherein the end face of the end of the stranded conductor is welded to the connecting part by ultrasonic roll welding or
    by longitudinal ultrasonic welding.

3. The method according to claim 1, wherein the stranded conductor is formed from an aluminium material or a copper material.

4. The method according to claim 1, wherein the connecting part is a flat part.

5. The method according to claim 1, wherein the strands are pressed into a bundle by the sleeve.

6. The method according to claim 5, wherein the sleeve absorbs upsetting forces of an ultrasonic welding tool.

7. The method according to claim 1, wherein a cavity free weld seam is formed between the end face of the end of the strand conductor together with the sleeve and the connecting part.

8. The method according to claim 1, wherein the sleeve is formed from an aluminium material or a copper material.

9. The method according to claim 1, wherein the connecting part is a flat conductor or a sheet-metal stamped part, and wherein one end of the flat
    conductor or sheet-metal stamped part is connected to the stranded conductor.

10. The method according to claim 1, wherein the connecting part is a round conductor.

11. A connection of a stranded conductor and a connecting part, comprising:
    a sleeve enclosing an end of the stranded conductor, and
    the connecting part which is connected in a material-locking manner to the end of the stranded conductor,
    wherein an ultrasonic welding seam is formed between an end face of the end of the stranded conductor and the connecting part,
    an ultrasonic welding seam is formed between the stranded
    conductor and the sleeve,
    the strands of the stranded conductor are materially-locked together, and
    an outside surface of the stranded conductor is materially-locked to an inside surface of the sleeve.

12. The method of claim 1, wherein the connecting part is formed from an aluminium material or a copper material.

13. The method of claim 1, wherein the connecting part is formed from a composite material.

14. The method of claim 13, wherein the connecting part is formed from a plastic-aluminium composite material.

* * * * *